United States Patent Office 3,781,296
Patented Dec. 25, 1973

3,781,296
COMPLEX MIXTURES OF N-BENZYL-DIHYDRO-NICOTINIC ACID DIMERS AND METAL SALTS THEREOF AND DERIVATIVES THEREOF
Carl C. Greco, Garnerville, N.Y., Stanley B. Mirviss, Stamford, Conn., and Arthur E. Martell, College Station, Tex., assignors to Stauffer Chemical Company, New York, N.Y.
No Drawing. Filed Oct. 27, 1971, Ser. No. 193,201
Int. Cl. C07d *31/36*
U.S. Cl. 260—295.5 R   7 Claims

ABSTRACT OF THE DISCLOSURE

There is disclosed the preparation of novel compositions comprising complex mixtures of salts of di-(1-benzyl-3-carboxyl-1,2-dihydropyridyl-2) ethers, the salts of the corresponding sulfides and polysulfides and the position isomers and other products resulting from the reaction between a 1-benzyl-3-carboxy-pyridinium halide and an alkali metal, or ammonium, hydroxide, sulfide or polysulfide. These complex mixtures are particularly suitable for use as brightening agents of the alkaline cyanide zinc plating baths employed for the electrodeposition of zinc, as sequestrants and as stabilizers for plastics and rubbers.

RELATED APPLICATION

The use, as plating bath additives of the novel complex mixtures of this invention is disclosed and claimed in copending application Ser. No. 193,203, filed Oct. 27, 1971.

BACKGROUND OF THE INVENTION

Nicotinic acid, and various derivatives thereof, have long been known in the art. While nicotinic acid itself found early use as a food supplement, certain of its derivatives were found to be useful as electroplating brightening additives. For example, the inner salts of 1-benzyl-pyridinium 3-carboxylate and p-xylylene, bis-(1-pyridinium-3-carboxylate) are disclosed for this use in U.S. Pat. 3,411,996, issued on Nov. 19, 1968 to J. D. Rushmere and N-allyl alkyl carboxylate pyridinium halides, N-benzyl alkylcarboxylate pyridinium halides and N-sulfoalkyl alkyl carboxylate pyridinium halides inter alia are disclosed in U.S. Pat. 3,318,787, issued on May 9, 1967 to Gustav Rindt et al. Other compounds related to nicotinic acid are disclosed in British Pat. 1,170,058 (complete specification published Nov. 12, 1969).

Thus, the electrodeposition of zinc from alkaline cyanide zinc solutions is a widely utilized procedure for the preparation of coatings designed to protect ferrous metals by the means of a sacrificial cathodic reaction. The plating baths utilized in this process often contain one or more additives whose purpose is to provide the resulting zinc coatings with a luster or brightness as well as with a desirable surface smoothness. Although many different types of materials have been proposed, none has proven to be completely satisfactory with respect to their cost, ease of utilization and/or the quality of the resulting zinc coatings.

It is, therefore, the prime object of this invention to provide a novel class of compounds particularly suitable for use as additives for alkaline cyanide zinc plating baths wherein their presence leads to the preparation of zinc coatings which are exceedingly smooth, bright, adherent and lustrous. Various other objects and advantages of this invention will be apparent from a reading of the disclosure which follows hereinafter.

TECHNICAL DISCLOSURE OF THE INVENTION

The novel compositions of this invention comprise complex mixtures of a variety of compounds which include structures (A), (B), (C) and (D) corresponding to the formulae:

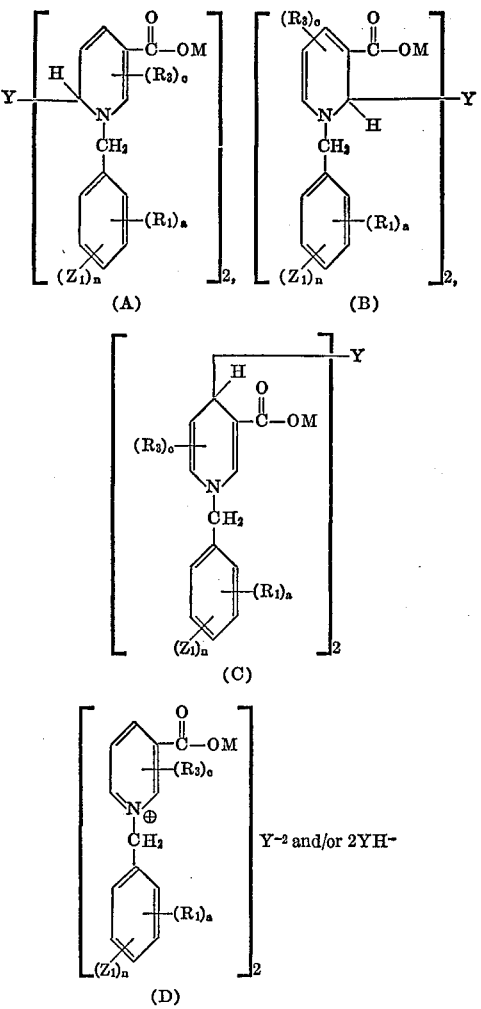

wherein Y in (A), (B) and (C) is selected from the group consisting of oxygen and (S)$x$ but wherein in (D) Y can only be (S)$x$; M is a cation having a molecular weight of less than 140 selected from hydrogen and the cations of the metals of Groups Ia, IIa and IIb of the Periodic Table as set forth in the back inside cover of the Handbook of Chemistry and Physics, 46th ed. 1965–1966, published by the Chemical Rubber Co., and ammonium; $R_1$ and $R_3$ are essentially hydrocarbyl groups containing from 1 to 12 carbon atoms inclusive and can be the same or different.

$Z_1$ can be a mercapto, halogen, carbalkoxy, carboxy, hydroxy, lower alkyl carboxylate or nitrile group and can be the same or different; $x$ is an integer having a value of from 1 to 4 inclusive and can have a mixture of values of from 1 to 4; and $a$, $c$, and $n$ are integers having a value of from zero to 2 inclusive and can be the same or different. It is, of course, understood that when $a$, $c$ or $n$ have a value of zero, the substituent $R_1$, $R_2$ or $R_3$ is not present and a hydrogen atom is present in its stead. In derivatives having the structures (A), (B) and (C) the Y group is substituted upon either the 2, 4 or 6 positions of a dihydropyridine ring. However, the precise points of attachment of the Y groups to the dihydropyridine ring in the compounds which comprise the complex mixtures of this invention is not readily ascertainable by the use of presently available analytical techniques and it seems likely that most or all of these three position isomers are present. Analytical data also indicate the presence of the pyridinium sulfide salt, especially at pH values below 9. The presence of other N-benzyl nicotinic acid derivatives including dipyridine 4,4; 2(6),4; or 2(6),2(6) compounds is also indicated. Thus, at least 20 different compounds can be present in some of the novel compositions of this invention.

Thus, it has been found that the use of the complex mixtures of compositions derived from the reaction between an aqueous sodium sulfide solution and a 1-benzyl-3-carboxy-pyridinium halide in a cyanide zinc plating bath yields zinc coatings characterized by their unusually high degree of smoothness, luster, adherence and brightness. In addition to their use as plating bath additives, the above described complex mixtures of compounds may also be employed as rubber curing agents, as rubber curing accelerators, as chelating agents and as plastic stabilizers, particularly for the heat stabilization of polyolefins. Certain of the novel complex mixtures of this invention perform outstandingly in these applications. Moreover, it is contemplated that certain of these derivatives may have biological, particularly anti-carcinogenic activity.

As used in this disclosure, the term "essentially hydrocarbyl" is intended to include groups consisting essentially of carbon and hydrogen. It is of course understood that such groups can contain other groups which are relatively inert and do not change the basic nature of the substituent. Alkoxy, aryloxy, arylalkoxy, alkyloxyaryl, aryloxy, alkyl, alkoxyalkyl, alkythio, alkylthioalkyl, arylthio, alkylthioaryl, arylthioalkyl groups and polyalkyleneglycol and polyalkylenethioglycol residues are exemplary of such groups. When multiple ether or thioether groups are present, it is desired that no more than 6 be present in a substituent and, of course, each substituent should contain no more than 12 carbon atoms inclusive.

Included within the definition of the term "essentially hydrocarbyl" are the aliphatic, cycloaliphatic and aromatic hydrocarbon moieties containing from about 1 to 12 carbon atoms inclusive. Illustrative of the aliphatic hydrocarbon moieties are the alkyl moieties such as methyl, ethyl, propyl, butyl, pentyl, hexyl, heptyl, octyl, nonyl, decyl, undecyl, dodecyl, methoxy, propoxy, hexoxy, octoxy, dodecoxy, ethylthio, propylthio, pentylthio, nonlythio, methoxymethyl, ethoxymethyl, ethoxyethyl methoxyoctyl, methylthiopropyl, pentylthiomethylthio, nonylthio and hexylthiohexyl groups and the like.

Illustrative of the cycloaliphatic hydrocarbon moieties are cycloalkyl groups such as cyclopropyl, cyclobutyl, cyclopentyl, cyclohexyl, cyclopentoxy, cyclohexoxy, cyclohexylthio, cyclohexylpropyl, methoxycyclopropyl and the like. Illustrative of the aromatic hydrocarbon moieties are phenyl, benzyl, phenethyl, tolyl, naphthyl, phenoxy, benzyloxy, naphthoxy, phenoxyphenyl, phenylthio, benzylthio and naphthylthio groups and the like.

For purposes of this invention, applicable halogen substituents are intended to include those having an atomic weight of less than 130 such as fluorine, chlorine, bromine and iodine. When the substituent Z is present as a halogen, it is preferred that the halogen be chlorine since this element is more readily commercially available than the other halogens and causes relatively little difficulty in respect to corrosion and handling.

As indicated above, Z can also represent inter alia, a lower alkylcarboxylate group. When Z represents such a substituent, it is preferred that the lower alkyl group of the carboxylic acid ester contain from 1 to 8 carbon atoms and preferably from 1 to 4 carbon atoms. This preference is dictated both by economic factors and by the solubility characteristics of these compounds in the media where they will be used.

M in Formulae A, B, C and D hereinabove represents a cation having a molecular weight of less than 140 as selected from hydrogen and the cations of the metals of Groups Ia, IIa and IIb of the Periodic Table of Elements, and ammonium. The group Ia cations include hydrogen, lithium, sodium, potassium, rubidium and cesium. The IIa group includes beryllium, magnesium, calcium, strontium and barium. The IIb group of elements includes zinc and cadmium. Ammonium cations are of course well known. Intended to be included within this category are ammonium ($NH_4^+$) and alkyl ammonium cations such as ethyl ammonium, dibutyl ammonium, trimethyl ammonium, benzyltriethyl ammonium and the like. These ammonium ions can be represented by the formula:

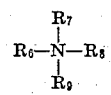

wherein $R_6$–$R_9$ are hydrogen, alkyl and/or aryl wherein the alkyl groups may each contain from 1 to 8 carbon atoms inclusive and the aryl groups contain from 6 to 10 carbon atoms inclusive with the proviso that the total molecular weight of the ammonium ion is less than 140.

The preparation of the novel complex mixtures of this invention is quite simple and involves, in the case of the ether salts of structures (A), (B) and (C), and especially (B), the reaction between a pyridine salt, particularly 1-benzyl-3-carboxypyridinium chloride, and an alkali metal or ammonium hydroxide with sodium hydroxide being preferred for this purpose. In conducting this reaction, the pyridinium salt is first dissolved in water which is heated to a temperature of from about 0 to about 100° C. with the preferred range being from about 25 to 75° C. This solution is then cooled down to a temperature of about 25° C. whereupon the alkali metal or ammonium hydroxide, which is first dissolved in water, is introduced. The reaction is allowed to proceed under agitation, at room temperature until its completion which is indicated by a change in the color of the solution from colorless to orange-red. This ordinarily requires a reaction period of about one hour. While superatmospheric pressures can be employed in this reaction, it is preferred to employ atmospheric pressure. As thus prepared, the resulting complex mixture of compounds can be used as a plating bath additive in the form of the solution in which it is dissolved. Or, if desired, the solid reaction product may be obtained upon evaporation or distillation of the solution and then extracting this residue with a lower alkanol such as methanol.

The corresponding complex mixtures of sulfide and polysulfide salts of structures (A), (B), (C) and (D) as well as many other compounds present in these complex mixtures are prepared by means of a reaction which is essentially identical to the above described procedure used for preparing the mixtures of ether salts with the exception that an alkali metal, or ammonium, sulfide or polysulfide rather than an alkali metal, or ammonium, hydroxide is rected with the 1-benzyl-3-carboxy-pyridinium chloride salt. The preferred alkali metal sulfide for this purpose is sodium sulfide.

With respect to proportions, the concentration of the alkali metal or ammonium hydroxide or alkali metal or ammonium sulfide or polysulfide which is used in the reaction should be about 1.5 times on a molar basis, the concentration of the pyridinium salt. Optimum results are obtained by employing this reactant in a molar excess of about 50%. Moreover, it is preferable to employ a solvent or diluent in preparing these novel derivaitives. Suitable solvents include water, lower alkanols such as methanol, ethanol, propanol, butanol and the like, dimethylsulfoxide, dioxane, dimethyl formamide, tetrahydrofuran and any other polar solvents which are inert under the conditions of the reaction.

The 1-benzyl-3-carboxy-pyridinium chloride employedf as the intermediate in the above described reactions, is itself prepared by reacting an aryl methylene chloride with nicotinic acid or with a ring substituted derivative thereof. This reaction is conveniently conducted at temperatures of from about 15° to about 150° C. although temperatures in the range of 25° to 100° C. are preferred because of the ease of operating at these temperatures. This reaction can be conducted at atmospheric or superatmospheric pressure. While it is generally preferred to conduct this reaction at atmospheric pressure, autogeneous pressures developed while operating in a closed system are equally desirable. Stoichiometric amounts of the reactants can be employed in this reaction although it is preferred to employ a molar excess of the aryl methylene chloride. It is most preferred to employ a molar excess of this reactant of from about 20 to 150%. Solvents or diluents can be effectively employed in conducting this reaction although they are not necessary. Exemplary of suitable solvents and diluents are water, lower alkanols such as methanol, ethanol, propanol, butanol and the like, dimethylsulfoxide, dioxane, dimethyl formamide, tetrahydrofuran or any other polar solvent which is inert to the reactants employed under the conditions of the reaction.

Although the processes used for the preparation of the novel complex mixtures of compounds of this invention have been described with respect to the use, therein, of 1-benzyl-3-carboxy-pyridinium chloride, it is also possible to employ other corresponding halide salts including the bromide and iodide salts. In addition, the benzyl and/or the pyridine rings of the pyridinium salt may be substituted with one or more non-interfering substituent groups, i.e. with groups which will not interfere in the reaction between the salt and the alkali metal or ammonium hydroxide, or the alkali metal or ammonium sulfide or polysulfide. Such non-interfering substituent groups include alkyl, aryl, arylalkyl, alkylaryl, alkoxy, alkylthio, aryloxy, halo and carbalkoxy groups.

When the complex mixtures of compounds of this invention are to be employed as rubber additives, e.g. as curing or accelerating agents, it is preferred that Z in the above given formulae be hydrogen or mercapto, that M be ammonium, zinc or cadmium, that Y be sulfur only, and the $x$ have a value of from 2–4 or one can utilize mixtures of compounds wherein $x$ has values of from 1–4. When these mixtures of compounds are employed as rubber curing additives, they are generally employed in amounts from about 0.1 to 5.0 phr. and preferably from about 0.25 to 3.0 phr.

When the complex mixtures of compounds of this invention are employed as plastics or rubber additives or as stabilizers, it is preferred that $Z_1$ and $Z_2$ be hydroxy or hydrogen, M is preferably hydrogen, zinc, cadmium, or calcium, Y is preferably sulfur and $x$ is 1 or 2. When these mixtures of compounds are used as plastics or rubber additives, they are generally used in amounts of from about 0.05 to 0.5 phr. and preferably from about 0.25 to 3.0 phr.

The complex mixtures of compounds of this invention additionally serve as chelating agents. In this area of application it is preferred that M be either $NH_4^+$ or one of the Group Ia metal ions. These mixtures of compounds are useful for the chelation of the so-called heavy metal ions including the Ib, IIb, IIIb, IVb, V, VIb, Va, and VII metals such as $Cu^{+2}$, $Ag^+$, $Zn^{+2}$, $Sc^{+3}$, $Ti^{+4}$, $V^{+3}$, $Cr^{+3}$, $Mn^{+2}$, $Ni^{+2}$, $Mn^{+4}$, $Fe^{+3}$, $Fe^{+2}$, $Co^{+2}$, $Pd^{+2}$, $Pt^{+4}$, etc. When the mixtures of this invention are to be employed as chelating agents, it is preferred that M be ammonium, sodium or potassium and that $x$ must have a value of from 1–2 since, if $x$ has a value of 3 or higher, it may lead to the formation of a highly insoluble metal sulfide. The specific substituents preferred in any given instance are to a large extent dependent upon the particular system in which the chelating agent is employed.

For example, if the agent is to be employed in an aqueous system, it is preferred that $R_3$ and/or $R_1$ or $R_2$ be $SO_3H$, $SO_3M$ or $CO_2M$ where M is as defined hereinabove. When these mixtures of compounds are employed as chelating agents, they are generally used in amounts of from 0.0001 to 25% and preferably from 0.005 to 15.0%, as based on the weight of solution to be treated.

The following examples will further illustrate the embodiment of this invention. In these examples, all parts given are by weight unless otherwise noted.

EXAMPLE I

This example illustrates the preparation, of a composition containing the sodium salt of di(1-benzyl-3-carboxyl-1,2-dihydropyridyl-2) ether, i.e.

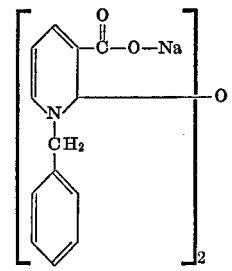

and which may also contain the corresponding isomers where the oxide group is attached to the dihydropyridine ring at the 4 position, i.e. a 1,4-dihydropyridyl-4 ether, and at the 6 position i.e. a 1,6-dihydropyridyl-6-ether.

Into a 1 liter, 3-neck flask equipped with a dropping funnel, stirrer and thermometer, there is added 20 grams (0.08 m) of 1-benzyl 3-carboxy-pyridinium chloride in 400 cc. of water. The resulting solution is heated to 45° C. in order to dissolve the pyridinium salt. After cooling to 30° C., 6 grams (0.16 m) of NaOH dissolved in 114 cc. of water is added to the reaction mixture, the NaOH being added over a 30 minute period. After the addition of the NaOH, the reaction mixture is agitated at room temperature for a period of one hour whereupon the solution changes from colorless to orange-red indicating the completion of the reaction. This solution contains 15.6%, by weight, of the desired ether derivatives.

A small portion of the solid reaction product is then isolated by distillation of the aqueous layer followed by extraction with methanol and subjected to infra-red, nuclear magnetic resonance and elemental analysis confirming the above given structure for this compound is at least one of its components.

Nitrogen calc. _____ 5.7
Nitrogen found _____ 5.3

EXAMPLE II

This example illustrates the preparation of a complex mixture containing sodium salts of di(1-benzyl-3-carboxyl-1,2-dihydropyridyl-2) sulfide, i.e.

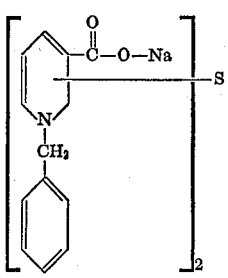

and its 4 and 6 positional isomeric sulfides, the pyridinium sulfides, i.e.

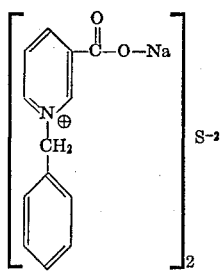

as well as other compounds such as the dipyridine compounds formed from the linking of two pyridine rings at the 2, 4 and/or 6 positions on the respective rings.

To a 1 liter reaction flask at room temperature, there is added 25 grams (0.2 mole) of nicotinic acid, 5 grams (0.4 mole) of benzyl chloride and 500 milliliters of methanol. The mixture is heated for 20 hours at reflux. After the heating period, the reaction mixture is distilled to approximately one quarter of its original volume and filtered. The filtrate is stripped to dryness to recover 26 grams (52% yield) of 1-benzyl-3-carboxy-pyridinium chloride. The pyridinium chloride is then dissolved in 400 cc. of water. The reaction mixture is heated to 45° C. and 6.2 grams (0.08 mole) of sodium sulfide dissolved in 114 cc. of water is added over a 30 minute period. The mixture is then heated between 60–70° C. for 2 hours and stripped to dryness on a flash evaporator. A red-orange solid remains. Only the methanol soluble fraction is isolated as the product in a yield of 10 grams.

*Analysis.*—Thin layer chromatography, liquid chromatography, mass spectral analysis, nuclear magnetic resonance and infra-red spectra indicate a complex mixture of compounds containing the structures described above.

EXAMPLE III

This example illustrates the preparation of a complex mixture containing the potassium salts of the mixture of compounds whose preparation is described in Example II.

Thus, in preparing this product an equivalent amount of potassium disulfide is substituted for the sodium sulfide reactant originally utilized in the procedure of Example II.

EXAMPLE IV

This example illustrates the preparation of a complex mixture containing the ammonium salts of the mixture of compounds whose preparation is described in Example II.

Thus, in preparing this product a molar equivalent of ammonium tetrasulfide, i.e. $[(NH_4)_2S_4]$ is substituted for the sodium sulfied originally used in the procedure of Example II.

EXAMPLE V

This example illustrates the preparation of a complex mixture of the barium, cadmium and zinc salts of the mixture of compounds whose preparation is described in Example II.

Four one gram samples of the product of Example II are dissolved in 16 cc. of methanol. Four aqueous solutions are then separately prepared as follows:

| Salt | Amount, grams | Water, cc. |
| --- | --- | --- |
| $BaCl_2$ | 1 | 20 |
| $CdCl_2$ | 1 | 20 |
| $ZnCl_2$ | 1 | 20 |
| $BaCl_2/CdCl_2$ | 0.5/0.5 | 20 |

Each one of the four aqueous salt solutions is added to a sample of the methanol solution of the product of Example II. The corresponding barium, cadmium, zinc, and barium-cadmium (mixed) salts precipitate from their respective solutions and are recovered by filtration.

EXAMPLE VI

This example illustrates the preparation of a complex mixture of compounds similar to the product whose preparation is described in Example II which in this instance also contains the sodium salt of di(1-para-chlorobenzyl-3-carboxyl-1,4-dihydropyridyl-2) sulfide.

Thus, the procedure of Example II is followed except that 64.2 grams (0.4 mole) of para-chlorobenzylchloride is, in this instance, used in place of benzyl chloride.

EXAMPLE VII

This example illustrates the use of the composition containing the sodium salt of di(1-benzyl-3-carboxyl-1,2-dihydropyridyl-2) ether as a brightening agent in an alkaline cyanide zinc plating bath.

The pH of the solution containing the sodium salt of di(1 - benzyl - 3 - carboxyl-1,2-dihydropyridyl-2) ether whose preparation is described in Example I, hereinabove, is adjusted to a value of 8 by the addition of hydrochloric acid. Thereafter, a portion of this solution is used in preparing an aqueous plating bath having the following composition:

| | Grams/liter |
| --- | --- |
| Zinc (as metal) | 36.2 |
| Sodium cyanide | 98.8 |
| Sodium hydroxide | 78.3 |
| Composition containing the sodium salt of di(1-benzyl-3-carboxyl-1,2-dihydropyridyl-2) ether | 1.169 |
| Polyvinyl alcohol | 0.195 |

A two ampere Hull cell panel plated from this bath is lustrous, bright and smooth surfaced in the range of from 8 to 80 a.s.f. and cloudy bright in the range of from 1 to 8 a.s.f. In contrast, when this same plating is conducted using an identical plating bath which does not, however, contain the novel additive of this invention, the resulting zinc coating is non-lustrous, white in appearance and lacking in smoothness.

EXAMPLE VIII

This example illustrates the use of the complex mixture containing sodium salts of di(1-benzyl-3-carboxyl-1,2-dihydropyridyl-2) sulfide as a brightening agent in an alkaline cyanide zinc plating bath.

The pH of the solution containing the sodium salts of di(1 - benzyl - 3 - carboxyl-1,2-dihydropyridyl-2) sulfide whose preparation is described in Example II, hereinabove, is adjusted to a value of 8 by the addition of hydrochloric acid. Thereafter, a portion of this solution is used in preparing an aqueous plating bath having the following composition:

| | Grams/liter |
| --- | --- |
| Mixture containing the sodium salt of di(1-benzyl-3-carboxyl-1,2-dihydropyridyl-2) sulfide | 0.75 |
| Polyvinyl alcohol | 0.195 |
| Zinc (as metal) | 110 |
| NaOH | 230 |
| NaCN | 295 |

A two ampere Hull cell panel is plated from this bath for 5 minutes using rod agitation. The deposit is hazy in the 0–9 a.s.f. range, bright in the range of 9–75 a.s.f. and cloudy bright in the range of 75–120 a.s.f.

Variations in proportions, procedures and materials may be made without departing from the scope of this invention as defined in the following claims.

What is claimed is:
1. A composition consisting of a complex mixture of compounds which include those corresponding to the formulae:

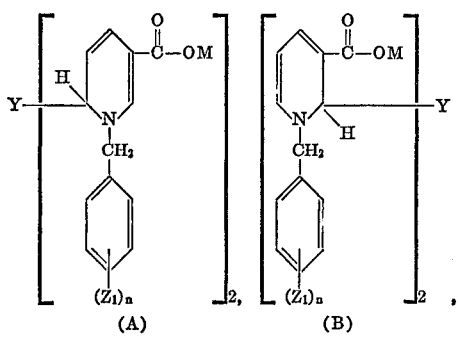

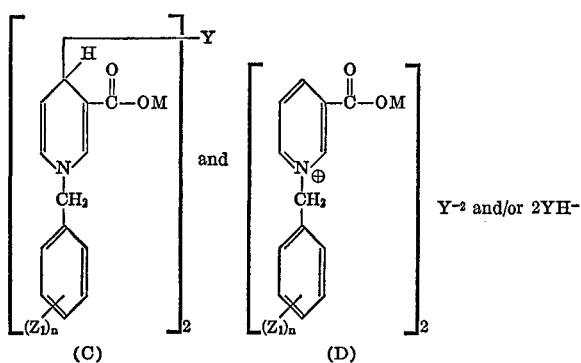

wherein Y in (A), (B), and (C) is selected from the group consisting of oxygen and $(S)x$ but wherein Y in (D) is $(S)x$; M is selected from the group consisting of hydrogen and the cations of Group Ia of the Periodic Table of the Elements and ammonium; $Z_1$ is a halogen; $x$ is an integer having a value of from 1 to 4 inclusive or a mixture of values of from 1–4 inclusive; and $n$ is an integer having a value of from 0 to 2 inclusive.

2. The compounds of claim 1, wherein Y is oxygen.
3. The compounds of claim 1, wherein Y is $(S)x$.
4. The compounds of claim 1, wherein M is selected from the group consisting of hydrogen, the cations of Group Ia and ammonium.
5. The compounds of claim 4, wherein $x$ is 1.
6. The compounds of claim 4, wherein $x$ is 2.
7. The compounds of claim 4 wherein $x$ is a mixture of values of from 1 to 4.

References Cited
UNITED STATES PATENTS
3,318,787  5/1967  Rindt et al. _____ 204—55 Y
3,411,996  11/1968  Rushmere _____ 204—55 Y ALAN L. ROTMAN, Primary Examiner U.S. Cl. X.R.
106—1; 204—55 Y; 260—270 R, 294.8 G, 294.9